United States Patent [19]

Ito

[11] Patent Number: 4,799,111
[45] Date of Patent: Jan. 17, 1989

[54] VIDEO SIGNAL RECORDING AND/OR REPRODUCING APPARATUS WITH A FUNCTION FOR RE-RECORDING A SEARCH CONTROL-INDEX SIGNAL

[75] Inventor: Yuji Ito, Kanagawa, Japan

[73] Assignee: Sony Corp., Tokyo, Japan

[21] Appl. No.: 112,513

[22] Filed: Oct. 26, 1987

[30] Foreign Application Priority Data

Oct. 27, 1986 [JP] Japan ................................ 61-254968

[51] Int. Cl.$^4$ ...................... H04N 5/782; G11B 27/30
[52] U.S. Cl. .................................. 360/14.3; 360/19.1; 360/18; 360/32; 360/49
[58] Field of Search .................... 360/14.3, 10.1, 10.2, 360/19.1, 32, 35.1, 13, 49, 14.1, 14.2, 72.2, 36.2, 18; 358/337, 343, 335, 339

[56] References Cited

U.S. PATENT DOCUMENTS

4,503,470 3/1985 Mita et al. ........................ 360/14.3
4,517,598 5/1985 Van Valkenburg et al. ... 360/14.3 X
4,546,391 10/1985 Kimura .............................. 360/35.1

Primary Examiner—Marvin L. Nussbaum
Attorney, Agent, or Firm—Alvin Sinderbrand

[57] ABSTRACT

In an apparatus for magnetically recording and/or reproducing an information signal, such as, an 8 mm video tape recorder, and which records index signals representing various data in the tracks in which the information signal is recorded, code signals indicative of the start point and the end point, respectively, of the index signal are recorded at the start and the end, respectively, of the recorded index signal. In the reproducing mode, when the start code is obtained, the following blocks representing the index signal are taken in and, when the end code is obtained such blocks are latched and subject to the reproducing processing while further taking in of the index signal is inhibited for several horizontal or line periods.

6 Claims, 11 Drawing Sheets

VIDEO SIGNAL RECORDING AND/OR REPRODUCING APPARATUS WITH A FUNCTION FOR RE-RECORDING A SEARCH CONTROL-INDEX SIGNAL

BACKGROUND OF THE INVENTION

1. Field of the Invention

This invention relates to an apparatus for magnetically recording and/or reproducing an information signal comprised of at least an audio signal and an index signal for use in controlling transportation of the tape.

2. Description of the Prior Art

Figure 1:
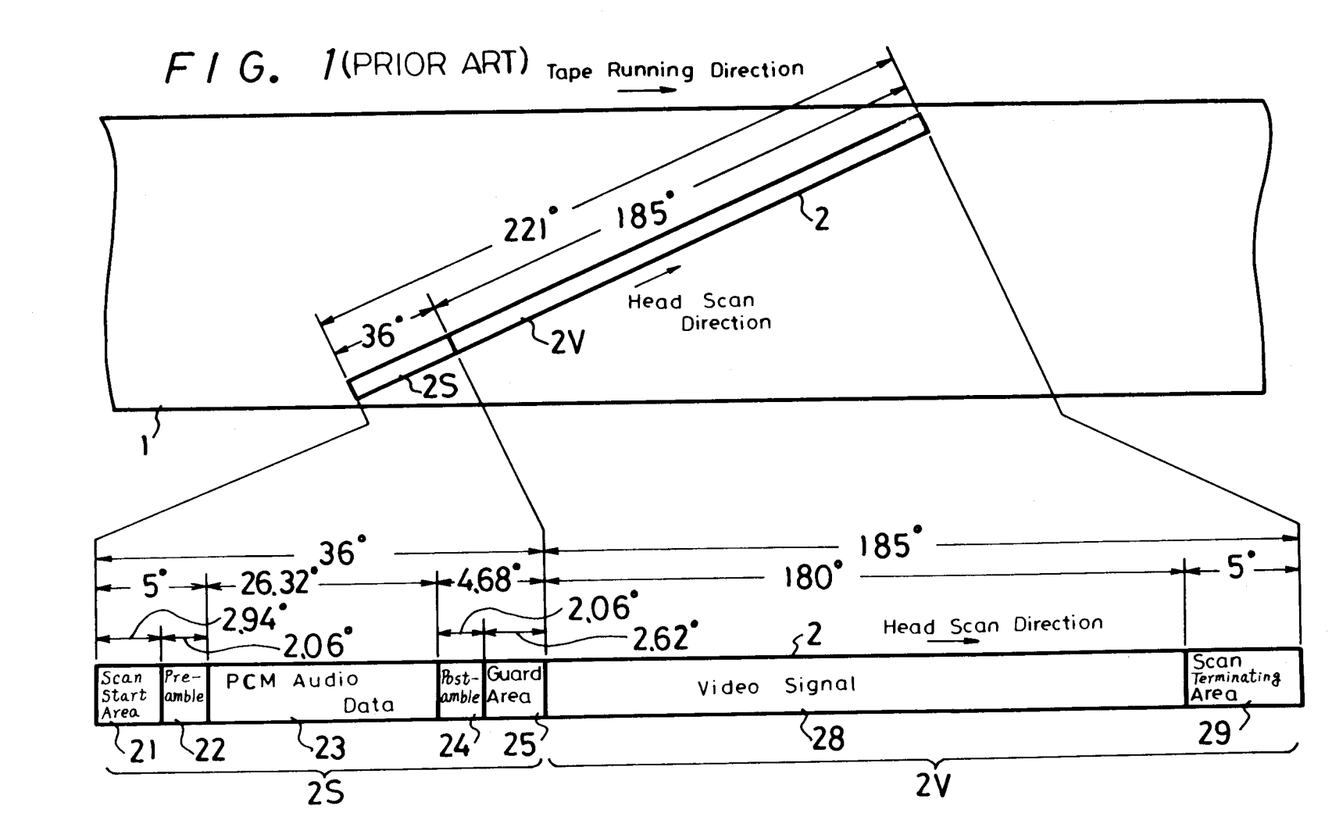
FIG. 1 is a diagram showing a known format for recording audio and video signals in slant tracks on a magnetic tape.

As is shown on FIG. 1, in accordance with a standard track format for an 8 mm video tape recorder, successive tracks, only one of which is indicated at 2, are formed obliquely on a magnetic tape 1 and are scanned alternately by two rotary magnetic heads which are angularly separated by 180°. The length of each track 2 corresponds to rotation of the respective head through an angle of 221°. A part 2S of each track 2 extending from its starting point and corresponding to rotation of the rotary head through an angle of 36°, is used for recording an audio signal. The remaining part 2V of the track corresponds to head rotation through an angle of 185° and is used for recording a video signal.

Each audio track part 2S is divided into successive areas 21–25. The area 21 is designated a scanning starting area for the rotary head, the area 22 is a preamble area in which a clock run-in is recorded, the area 23 is an audio data area for recording a PCM audio signal, the area 24 is a postamble area for providing a back margin in case of an after-recording operation, and the area 25 is a guard area between the track parts 2S and 2V.

The PCM audio data recorded in the area 23 corresponds to a stereo audio signal of one field period that is time-base compressed and PCM coded and includes an error correcting code, an ID code and the like. The data format for writing the PCM data, error correcting code (CRCC), ID code and the like into a memory with interleaving and time-base compressing is disclosed in U.S. Pat. No. 4,562,578, issued Dec. 31, 1985 and having a common assignee herewith. It has been disclosed to convert the signal recorded in each of the areas 22, 23 and 24 into a by-phase mark signal of 2.9 MHz when the value is "0" and of 5.8 MHz when the value is "1", before being recorded in each of such areas, for example, as in U.S. Pat. No. 4,551,771, issued Nov. 5, 1985 and also having a common assignee herewith.

The video track part 2V is shown to be divided into an area 28 following the guard area 25 and corresponding to rotation of the respective head through an angle of 180° and an area 29 corresponding to rotation of the head through the remaining angle of 5°. A frequency-multiplexed signal composed of an FM signal modulated by a luminance signal, a low-frequency converted carrier chrominance signal, an FM signal modulated by a monaural audio signal and a pilot signal for one field is recorded in and/or reproduced from the area 28. The area 29 is a scanning terminating area for the rotary head.

The above-described format allows the ID code to be recorded in the audio data area 23 together with the audio signal. Therefore, a variety of data, such as, the recording date, the absolute position along the tape, the program number, the scene cut number, the recording tape speed, whether the audio signal is stereo or monaural, or bi-lingual, and whether dubbing is possible, can be recorded and then utilized, for example, in a search mode for locating a desired starting point during reproduction, editing and the like.

However, by reason of the interleaving, the ID codes are recorded with the PCM audio data in a scattered manner. It is therefore necessary that the rotary head correctly scan the area 23 over a substantial length thereof in order to correctly reproduce the ID codes. However, in the search mode, the tape 1 is transported at a high speed, for example, 30 times higher than that used in the recording mode, so that the rotary head scans the area 23 obliquely, whereby the rotary head cannot correctly reproduce the ID codes scattered over the length of area 23.

To cope with the above problem, it has been proposed to record index signals, such as, the ID codes and so on, in the postamble area 24 of the audio track part 2S. For example, in U.S. Pat. Application Ser. No. 06/885,203 (filed July 14, 1986) and also having a common assignee herewith, and in the corresponding European laid-open Patent Application No. 0209151, it is disclosed to encode various data to be recorded in such postamble area 24.

The area 24 has a length corresponding to rotation of the rotary head through an angle of 2.06°. Since one field of video is recorded in area 28 of video track part 2V which corresponds to rotation of the head through 180°, and since there are 262.5H (H=one horizontal period) in each field, the area 24 corresponds approximately to a time period of 3.0H.

Figures 2A, 2B, 2C:
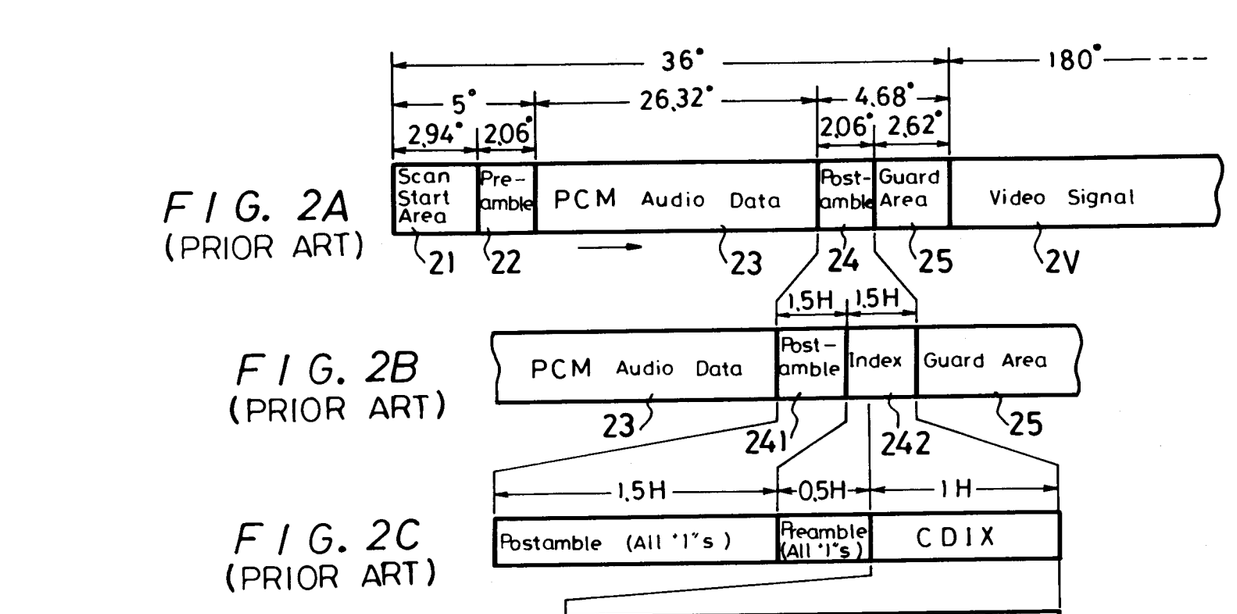
FIGS. 2A to 2E are diagrams specifically showing known recording formats for an audio track part of the slant track shown on FIG. 1.

The postamble 24 is, for example, divided into a first area 241 of 1.5H and a second area 242, also of 1.5H, as shown in FIGS. 2A and 2B. In the area 241 there is recorded a postamble signal exclusively formed of "1"s for the PCM audio signal recorded in the area 23. In the initial 0.5H period of the area 242, there is recorded a preamble signal exclusively formed of "1"s, and a coding index signal CDIX, which has the same contents as the encoded ID code, is recorded in the remaining 1H period of the area 242. The preamble signal recorded in the initial 0.5H period of the area 242 and formed exclusively of data "1"s of 5.8 MHz, is used, for example, as a clock run signal for the subsequent coding index signal CDIX.

Figure 2D:
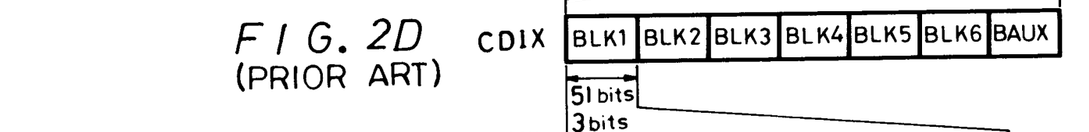
Figure 2E:
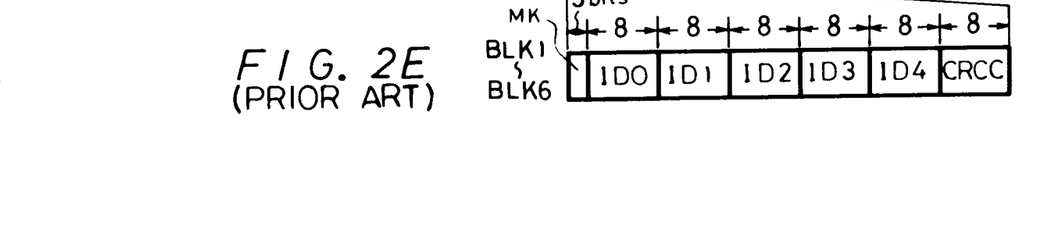

The coding index signal CDIX is equally divided into six blocks BLK1–BLK6 and a preparative area or auxiliary block BAUX, as shown in FIG. 2D. Further, each of the blocks BLK1–BLK6 is comprised of 51 bits divided into a 3-bit mark code MK used as a header for the data read, five 8-bit ID codes ID0–ID4 and an 8-bit CRC code CRCC provided for the ID codes ID0–ID4, as shown in FIG. 2E.

The blocks BLK1–BLK6 correspond to Modes 1–6, respectively, to which the ID codes ID0–ID4 recorded in the PCM audio data area 23 belong. The ID codes ID0–ID4 in the blocks BLK1–BLK6 are the same as the ID codes ID0–ID4 recorded in the area 23 which may be signals indicative of an absolute position on the tape 1, cut numbers designated each scene of the recorded contents, the recording data and time, and so on.

The ID codes ID0–ID5 interleaved with the PCM data and recorded in the PCM audio data area 23, as disclosed in U.S. Pat. No. 4,562,578, are recorded in a range of one field or one track corresponding to rotation of the head through an angular extent of 36° in the PCM audio data area 23. It is therefore necessary to provide at least six tracks for recording all of the information of the six blocks, that is, all the bits forming the ID codes ID0–ID5. Accordingly, each unit of information, for example, the tape address, program number, and time code, is designated as one of the Modes 1–6 and recorded in correspondence to respective blocks BLK1–BLK6. For example, if the system selects a readout of Mode 1, ID0=Mode Number 1, ID1=Hour, ID2=Minute, ID3=Second and ID4=Frame Number are displayed by the use of five ID codes ID0–ID4. If Mode 2 is selected, ID0=Mode Number 2, ID1=Program Number, ID2=Cut Number, ID3=Minute and ID4=Second are displayed.

The index signal CDIX in the area 242 is converted into a by-phase mark signal of 2.9 MHz when its value is "0" and of 5.8 MHz when its value is "1", and then recorded in the area 242 in the same manner as the signal recorded in the audio track 2S.

With the above-described recording format of the index signal CDIX, although the rotary head scans the track 2 obliquely with respect to the longitudinal direction of the track when the tape speed during reproducing is different from that for recording, since the area 242 is short, for example, has a length corresponding to 1.5H, the rotary head can scan the entire length of the area 242, or with correct tracking, even in the search reproducing operation, in which the tape transporting speed, is 30 times the tape speed for recording. Hence, it is certain the the index signal CDIX (ID codes) can be correctly reproduced.

The ID codes have different meanings dependent on the Modes 1–6. Therefore, if the ID codes recorded in the area 23 with the PCM audio data are used, it is necessary to reproduce six tracks, that is, six field periods have to be reproduced for obtaining the necessary ID codes. On the other hand, by the use of the format described above, since the ID codes for all the Modes 1–6 are recorded in the single area 242 as the index signal CDIX, it is sufficient to reproduce only one horizontal period within the area 242 and, hence, it is possible to immediately obtain the necessary ID codes.

The index signal CDIX can be recorded in a so-called after-recording operation after a video signal Sc and audio signals L and R have been recorded. For example, the ID code can be added to the already edited tape for identifying chapter numbers, as disclosed in Japanese Patent Applications No. 60-64554 and 60-161438.

However, if the index signal CDIX is recorded in the postamble area 24 as described above, problems can occur when the PCM audio signal is after-recorded or when the index signal CDIX is rewritten in the area 242.

Figure 3A:
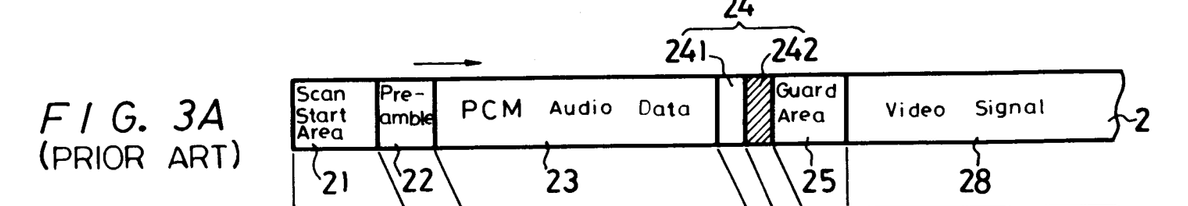
FIGS. 3E are diagrams showing known recording formats similar to FIGS. 2A and 2B, and to which reference has been made for explaining problems encountered therewith.
Figure 3B:
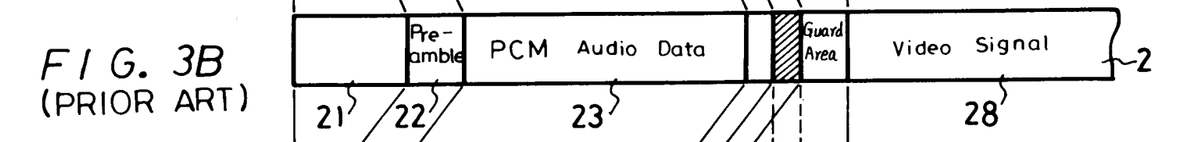
Figure 3C:
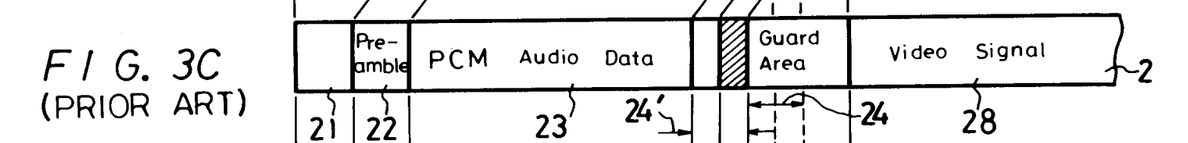

These problems will be explained more specifically with reference to FIGS. 3A to 3E. FIG. 3A illustrates the audio track part 2S and the starting region of the video track part 2V shown in FIGS. 1 and 2A. The format shown in FIG. 3A may be considered a reference recording format. When the PCM signal is actually after-recorded by a video tape recorder (VTR), the areas 22, 23 and 24 may be deviated, as a whole, toward the track area 28, as shown in FIG. 3B, or, on the contrary, toward the starting point of the track 2, as shown in FIG. 3C, due to errors in the mechanism and/or the signal timing, jitter caused by tape friction and the like. Even in the case where the PCM audio signal is recorded simultaneously with the video signal, the areas 22, 23 and 24 may be deviated from their reference positions, as shown in FIGS. 3B and 3C, due to the causes specified in the case of after-recording.

Figure 3D:
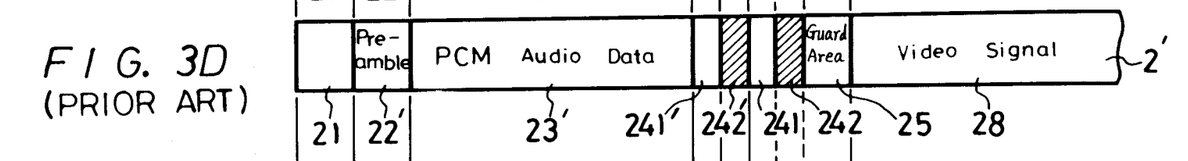

Thus, if a PCM signal is after-recorded on a track 2 which has its areas 22, 23 and 24 deviated from the reference positions as shown in FIG. 3B, and such after-recording is effected by a VTR which records the areas 22, 23 and 24 with the deviations shown in FIG. 3C, the resulting recorded track 2' is as shown in FIG. 3D. More specifically, the areas 22', 23' and 24' on FIG. 3D are newly formed by the after-recording. In this case, however, the old area 24, and especially the area 242 thereof, still remains between the new area 24' and the video track area 28. When the rotary head scans the track 2' thus formed, the new index signal CDIX is reproduced from the new area 242' and the old index signal CDIX is reproduced from the old area 242. Accordingly, when the index signal CDIX is used for a variety of control operations the fact that index signals are reproduced from the old and new areas 242 and 242' inevitably causes problems.

Figure 3E:
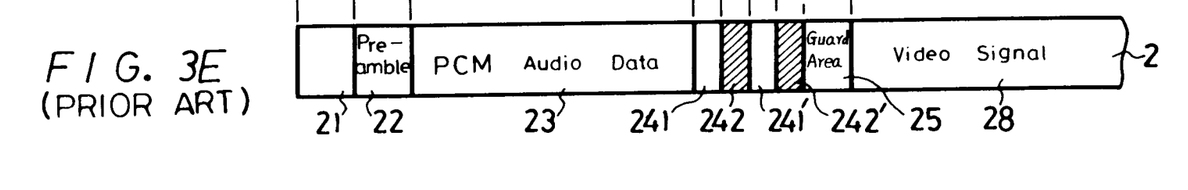

Moreover, if only the index signal CDIX is recorded in the area 242 on the track 2 recorded as shown in FIG. 2C by the use of a VTR which records signals with the deviations shown in FIG. 3B, the new areas 241' and 242' are formed following the old areas 241 and 242, as shown in FIG. 3E, provided that the tolerable range of the deviations of the areas 22, 23 and 24 is regulated to be between +1.5 and −1.5 horizontal periods. In such case, the end portion of the old area 242 is more or less erased by the starting end portion of the new area 241'. Since the new area 242' and the old area 242 both exist in this case, problems again are inevitable in the reproducing operation.

OBJECTS AND SUMMARY OF THE INVENTION

Accordingly, it is an object of the present invention to provide a recording and/or reproducing apparatus which avoids the above-mentioned problems.

In order to achieve the above object, the present invention provides, in an apparatus for recording and/or reproducing, in successive slant tracks on a record tape, an information signal comprised of at least an audio signal and an index signal for use in controlling transportation of the tape, the combination of:
audio signal processing means for converting an input audio signal to a digitized form in which the audio data for a predetermined length of time is grouped as a plurality of data blocks; transducer means scanning the slant tracks and being connected to the audio signal processing means for recording and/or reproducing the grouped data blocks containing the digitized audio signal for the predetermine length of time in a first part of a respective slant track on the tape; index signal generating means including means for generating a coded index signal to indicate respective input information; index area signal generating means for providing an index area signal in predetermined timed relation to the scanning by the transducer means of the first part of each slant track; switching means responsive to the index area signal for supplying the coded index signal to the transducer means for recording by the latter in a second part of the respective slant track which is located adjacent an end of the first part of the respective slant track; and start code and end code generating means for inserting a predetermined coded pattern into a starting area and an ending area, respectively, of the coded index signal recorded in said second part of the respective slant track.

The above, and other objects, feature and advantages of the present invention, will become apparent from the following detailed description of preferred embodiments which is to be read in conjunction with the accompanying drawings, in which the same reference numerals designate corresponding elements and parts in the several views.

BRIEF DESCRIPTION OF THE DRAWINGS

FIGS. to 5A to 5I are timing charts to which reference will be made in explaining the operations of the apparatus shown in FIG: 4.

DESCRIPTION OF THE PREFERRED EMBODIMENTS

An information signal recording and/or reproducing apparatus according to an embodiment of the present invention will now be described with reference to FIG. 4.

Figure 4:
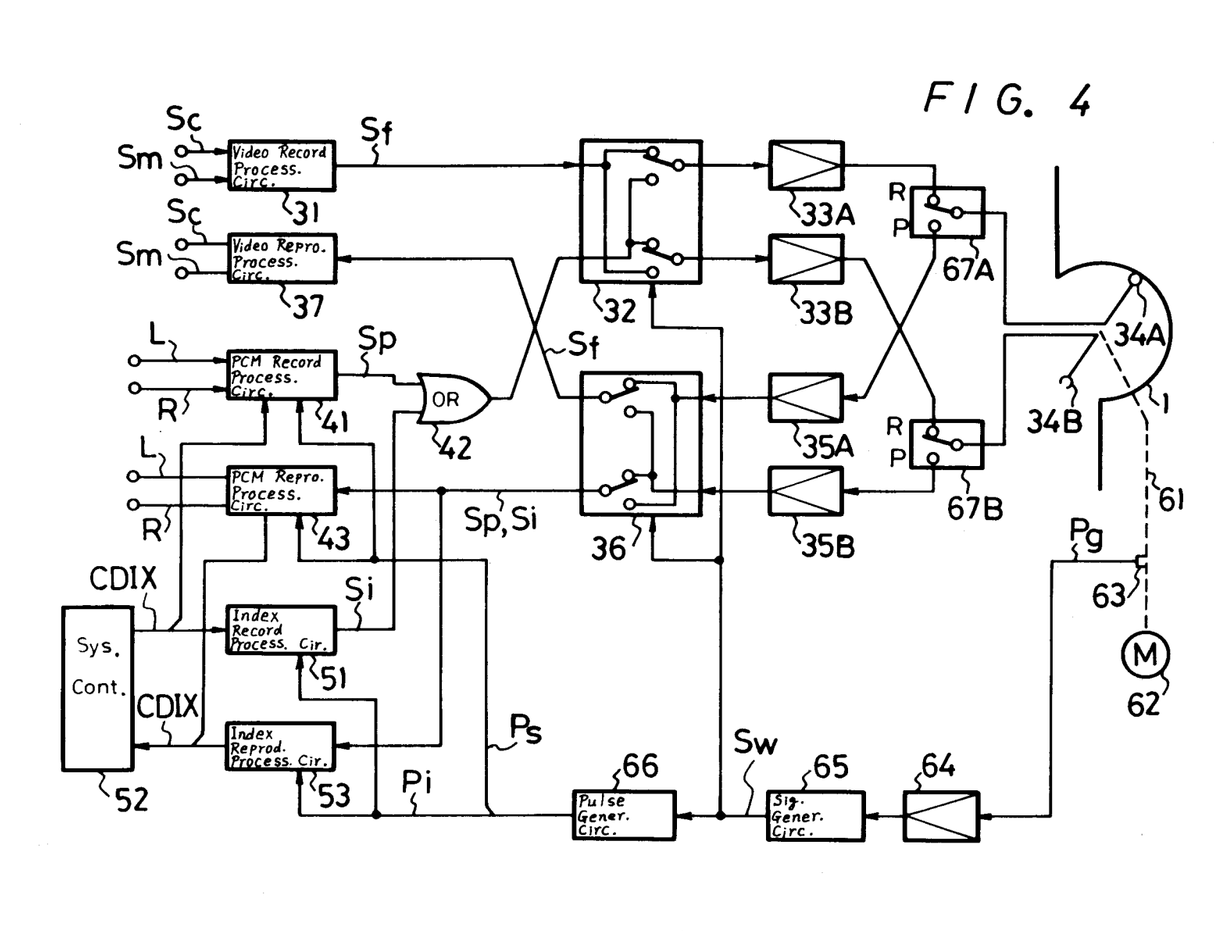
FIG. 4 is a circuit block diagram showing recording and reproducing circuits of an apparatus according to an embodiment the present invention.
Figure 5A:
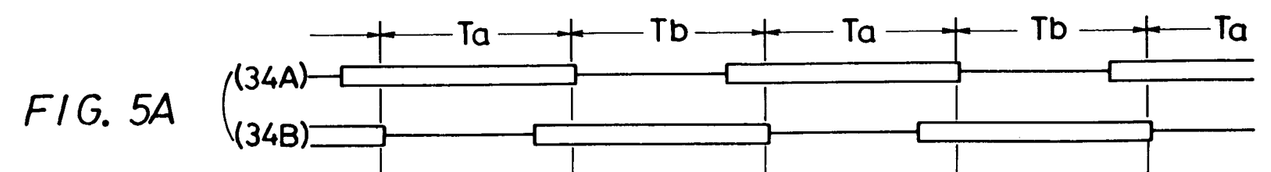

In the apparatus of FIG. 4, rotary magnetic heads 34A and 34B are spaced apart from each other by the angular distance of 180° and rotated by a motor 62 through a shaft 61 at a rotational speed equal to the frame frequency. A magnetic tape 1 is wrapped obliquely about the circumferencial surface of a guide drum (not shown) associated with the rotary heads 34A and 34B over a wrapping angle or range of about 221°. The rotational movements of the heads 34A and 34B are servo controlled so as to be synchronized with a video signal to be recorded during a recording operation and so as to correctly scan tracks 2 during a reproducing operation. More particularly, as shown in FIGS. 1 and 5A, the head 34A scans the area 28 of a respective track 2 in every other field period Ta and the head 34A scans the part 2S located in front of the area 28 during the 1/5 field period prior to each period Ta. On the other hand, the head 34B scans the area 28 of a respective track 2 in each remaining field period Tb and the area 2S in the 1/5 field period prior to the period Tb.

Figures 5B, 5C:
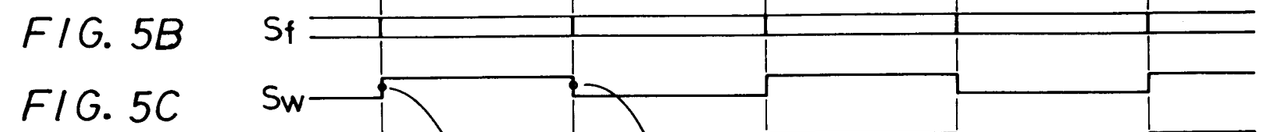
Figure 5D:
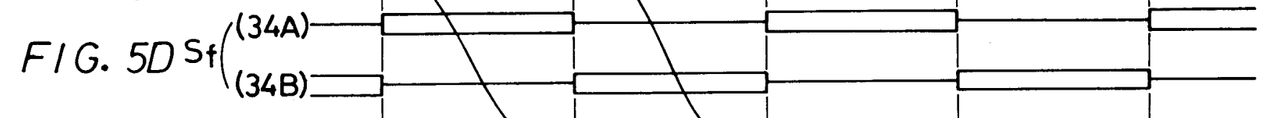

Returning to FIG. 4, it will be seen that, in the recording operation, a color video signal Sc and a monaural audio signal Sm are supplied to a video signal recording processing circuit 31 which delivers a frequency-multiplexed signal Sf comprised of the usual FM luminance signal, low frequency-converted carrier chrominance signal and FM audio signal and a pilot signal for identifying the head to be used for recording. The signal Sf is supplied to one input of a switching circuit 32. A pulse generating device 63 is provided, for example, in association with the rotating shaft 61 of motor 62, to generate a pulse Pg at the frame period so as to be indicative of the rotational positions or phases of the heads 34A and 34B. The pulse Pg is supplied through a pulse-shaping amplifier 64 to a signal generating or forming circuit 65 which provides a rectangular wave signal Sw which is inverted at each of the periods Ta and Tb, as shown in FIG. 5C. The signal Sw is supplied to the switching circuit 32 as a control signal for the latter so that the switching circuit 32 is changed-over to the contacting condition shown in FIG. 4 and to the opposite condition during the periods Ta and Tb, respectively. Therefore, the switching circuit 32 alternately outputs the signal Sf corresponding to the period Ta and that corresponding to the period Tb, through recording amplifiers 33A and 33B and respective recording contacts R of record/playback switches 67A and 67B to the heads 34A and 34B, respectively, as shown in FIG. 5D. Thus, the signals Sf are successively recorded in the video signal areas 28 of the successive tracks 2 on the tape 1 for the successive periods Ta and Tb.

Figure 5E:
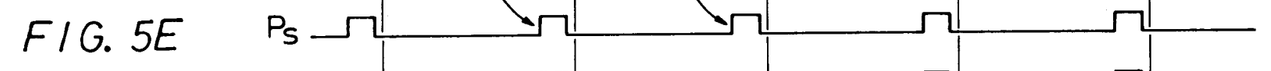
Figure 5F:
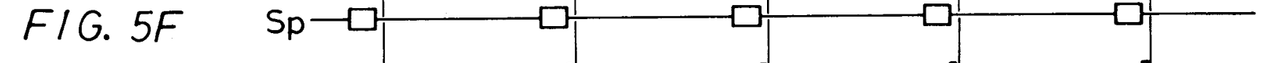

Further, a PCM recording processing circuit 41 is shown to be supplied with stereo audio signals L and R and also with an ID code (index signal) CDIX from a system controller 52 for controlling or determining the ID code. The signal Sw from signal forming or generating circuit 65 is supplied to a pulse generating circuit 66 which, in response to each change-over of the signal Sw, generates a pulse PS which becomes high or attains a high level during the following period in which the head 34A or 34B scans the areas 22 and 23 in the respective track as shown in FIG. 5E. The pulse Ps is supplied to the processing circuit 41 wherein the signals L and R and the ID code for one field portion are time-base compressed to within the period in which the pulse Ps is high, and then PCM-coded and added to the preamble signal to be recorded in the area 22, and finally converted into a by-phase mark signal Sp which is output from circuit 41, as shown in FIG. 5F.

The signal Sp is supplied from recording processing circuit 41 to one input of an OR circuit 42 which has its output connected to another input of the switching circuit 32. In the condition of the switching circuit 32 shown on FIG. 4, the signal Sp is supplied through the OR circuit 42, the switching circuit 32, the amplifier 33B and the contact R of the record/playback switch 67B to the head 34B during each field period Ta. On the other hand, during each field period Tb, the signal Sp is supplied through the OR circuit 42, the switching circuit 32 changed-over from the condition of FIG. 4, the amplifier 33A and the contact R of the switch 67A to the head 34A. Therefore, the signal Sp, that is, the preamble signal and the PCM audio data are recorded respectively in the areas 22 and 23 of each track 2 before the signal Sf is recorded in the video signal area 28 of the same track.

Figure 6A:
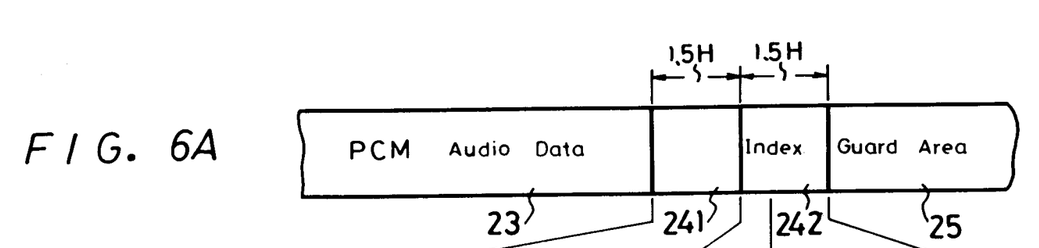
FIGS. 6A to 6D are diagrams showing recording formats employed in the apparatus according to the present invention.
Figure 6B:
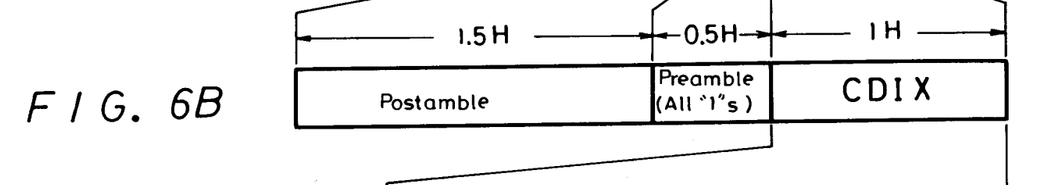
Figure 6C:
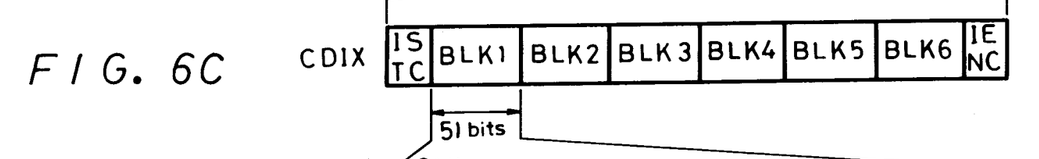
Figure 6D:
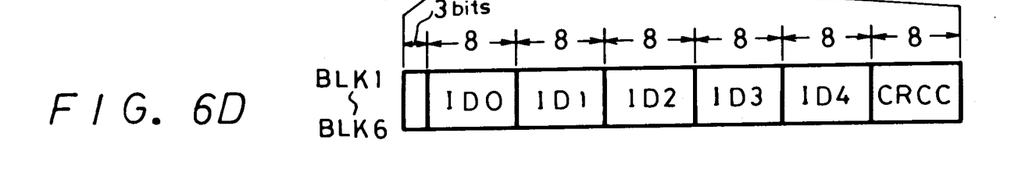

The index signal CDIX (ID code) is supplied from the controller 52 to an index signal recording processing circuit 51. As shown in FIG. 6C, the index signal CDIX employed according to the invention comprises the same blocks BLK1-BLK6 as in the example according to the prior art shown in FIG. 2D. However, in the present case, (FIG. 6C), the auxiliary block area BAUX is replaced by an index start code ISTC and an index end code IENC which are respectively added at the initial and trailing ends of the index signal CDIX. In other words, the blocks BLK1-BLK6 are arranged between the codes ISTC and IENC. Signals "1" and "0", for example, of 1.93 MHz, are repeatedly recorded as the codes ISTC and IENC, respectively.

Figure 5G:
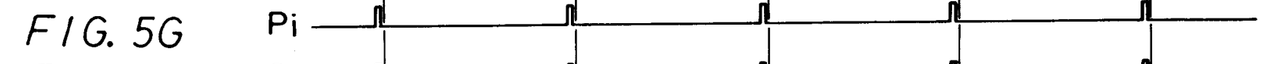
Figure 5H:
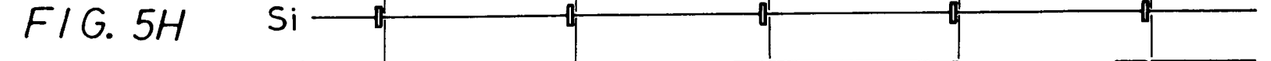
Figure 5I:
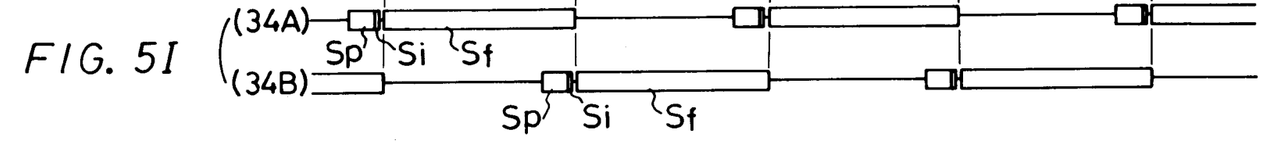

The generating circuit 66 also generates a pulse Pi (FIG. 5G) which attains the high level for a period of 1.5H (H is the horizontal period) starting from a time determined in respect to the rising edge of each pulse Ps, or in respect to the change-over of the signal Sw, so that the periods in which the pulse Pi occurs will correspond to the scanning of the areas 242 (FIG. 6A) by the heads 34A and 34B. The pulse Pi is supplied to the index signal recording processing circuit 51 wherein the preamble signal and the index signal CDIX are converted into a by-phase mark signal Si (FIG. 5H) which is output from circuit 51 during each period that the pulse Pi is at the high level. Such by-phase mark signal Si may be an FM signal in which the data "0" is 2.9 MHz and the data "1" is 5.8 MHz.

The output of circuit 51 is connected to another output of OR circuit 42. Therefore, the signal Si from circuit 51 is supplied by way of the OR circuit 42, the switching circuit 32 in the condition shown on FIG. 4, the amplifier 33B and the contact R of the switching circuit 67B to the head 34B during each field period Ta. On the other hand the signal Si occurring during each filed period Tb is supplied from the circuit 51 through the OR circuit 42, the changed-over switching circuit 32, the amplifier 33A and the contact R of the switching circuit 67A to the head 34A. Therefore, the signal Si, that is, the preamble signal and the index signal CDIX, is recorded in the area 242 on each track 2 after the signal Sp is recorded in the PCM audio data area 23 of the respective track 2.

Accordingly, the several signals are recorded in each track 2 with the format as shown in FIGS. 6A-6D.

In a reproducing operation, the signals Sp, Si and Sf successively reproduced alternately by the heads 34A and 34B are supplied to a switching circuit 36 by way of respective reproducing contacts P of the switching circuits 67A and 67B and reproducing amplifiers 35A and 35B, respectively. The switching circuit 36 is also supplied with the signal Sw from the circuit 65 as a control signal. The switching circuit 36 is thus controlled so that, during the concluding portion of a field period Ta or Tb when the signal Sf reproduced by the head 34A or 34B, respectively, is being derived at one output of the switching circuit 36, the signals Sp and Si being reproduced by the other head 34B or 34A is provided at another output of the circuit 36.

The signal Sf delivered from the switching circuit 36 is supplied to a video signal reproducing processing circuit 37 which reproduces therefrom the original color video signal Sc and monaural audio signal Sm.

A PCM reproducing processing circuit 43 is supplied with the signals Sp and Si from the switching circuit 36 and with the pulse Ps from circuit 66 as a window signal and is operative to reproduce the original stereo audio signals L and R from the signal Sp. The ID code (index signal CDIX) contained in the signal Sp is also extracted therefrom by the reproducing processing circuit 43 and supplied to the controller 52.

The signals Sp and Si from the switching circuit 36 are also supplied to an index reproducing processing circuit 53 which is operative to extract the index signal CDIX from the signal Si. The start code ISTC is located at the head portion of the index signal CDIX and the end code IENC is at the rear end portion of the same as set forth above. Therefore, when the start code ISTC is obtained, the subsequent blocks BLK1-BLK6 are taken in. Then, when the end code IENC is obtained, the taken-in blocks BLK1-BLK6 are latched to be processed for reproduction, and further taking in of the signal CDIX is inhibited for several successive horizontal periods, that is, for a period in which the heads 34A and 34B might scan the old area 242 on FIG. 3D.

The latched blocks BLK1-BLK6 constituting the index signal CDIX are supplied to the controller 52 wherein processing, such as, start point searching, absolute position detecting, cut numbering and so on is carried out by the use of the index signal CDIX derived from the processing circuit 53, or by the use of the index signal CDIX derived from the processing circuit 43, for example, when the index signal is not recorded in the area 242 and hence cannot be derived from the processing circuit 53.

According to the present embodiment, since the index signal CDIX is recorded in a portion 242 of the postamble area 24, the necessary ID code can be immediately obtained even in a search reproducing operation. More particularly, since the start code ISTC and the end code IENC are added to the index signal CDIX at the start and rear end portions, respectively, thereof, in the reproducing operation, when the start code ISTC is obtained, this affirms that the subsequent blocks BLK1-BLK6 are to be taken in. Then, when the end code IENC is obtained, this confirms that the taken-in blocks BLK1-BLK6 are to be latched and processed for reproduction and that the signal CDIX is not to be further taken in for the following several horizontal periods. Therefore, even if an old index signal area 242 remains behind the new index signal area 242', as in FIG. 3D, only the correct index signal CDIX is obtained, and the index signal CDIX from the old index signal area is not derived.

Even if the old index signal area 242 remains in front of the new index signal area 242' as shown in FIG. 3E, in such case, the end code IENC of the old area 242 is overwritten by the new index signal CDIX in area 242' so that the old index signal CDIX recorded in the area 242 is not latched. Accordingly, it is possible to take in or derive only the new index signal CDIX recorded in the area 242'.

Figure 7:
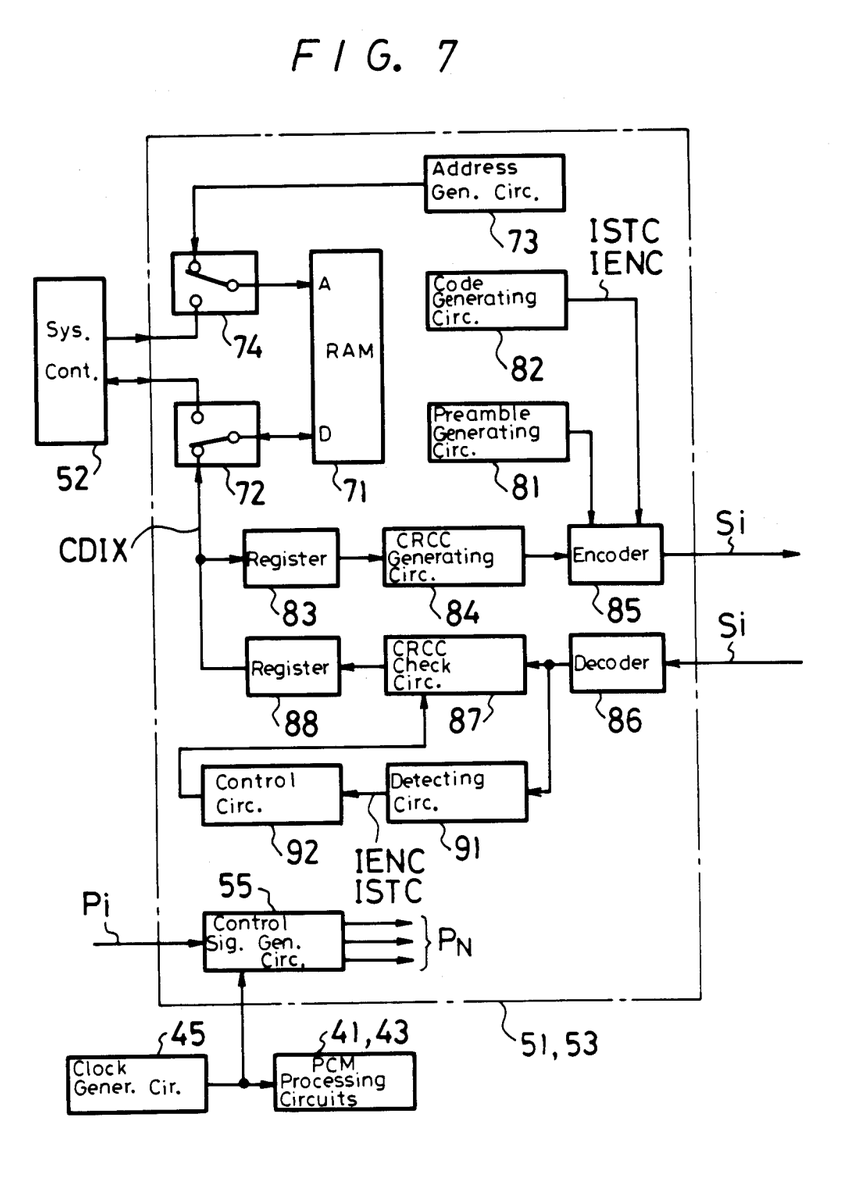
FIG. 7 is a circuit block diagram showing further details of a signal processing section included in the apparatus shown in FIG. 4.

Referring now to FIG. 7, it will be seen that the processing circuits 51 and 53 may desirably include portions enclosed by a dot-dash line and which are integrated in a single chip IC.

In FIG. 7, a clock generating circuit 45 generates a clock signal and supplies the same to the PCM processing circuits 41 and 43 as well as to the processing circuits 51 and 53. A control signal generating circuit 55 receives the pulse Pi from circuit 66 and generates a variety of control signals $P_N$ at predetermined timings with reference to the pulse Pi. These control signals $P_N$ and the clock signal from the clock generating circuit 45 are supplied to the various circuits of the apparatus included within the dot-dash line on FIG. 7.

In the recording operation, the system controller 52 outputs the index signal CDIX without the start code ISTC and the end code IENC during periods in which the heads 34A and 34B do not scan the area 242. Such index signal CDIX from controller 52 is supplied to a data input D of a buffer RAM 71 through a switching circuit 72. An address input A of the buffer RAM 71 receives an address signal for assigning a memory location from an address generating circuit 73 through a switching circuit 74. Therefore, the index signal CDIX to be recorded is stored in the RAM 71 at a location indicated by such address signal When either of the heads 34A and 34B reaches the beginning portion of the area 242 in the track 2 being scanned thereby, the pulse Pi becomes high and the preamble signal is outputted from a preamble generating circuit 81 for 0.5 horizontal or line periods in response thereto. The preamble signal is supplied to an encoder 85 where it is encoded to be included in the by-phase mark signal Si which is outputted to the OR circuit 42 on FIG. 4.

Next, after each of the heads 34A and 34B has scanned the area 242 for 0.5 horizontal periods, a code generating circuit 82 generates the index start code ISTC in a predetermined bit arrangement. Such code ISTC is supplied to the encoder 85 to be encoded and also included in the by-phase mark signal Si which is outputted to the OR circuit 42.

Following the above processing, the address generating circuit 73 supplies the address signal to the RAM 71 through the switch circuit 74 to read out the index signal CDIX from the RAM 71. The read-out index signal CDIX is supplied through the switching circuit 72 to a register 83 wherein the parallel index signal CDIX is converted into a serial index signal CDIX. The converted serial index signal CDIX is supplied to a CRCC generating circuit 84 wherein a CRC code is added to the serial index signal CDIX. The serial index signal CDIX with the added CRC code is supplied to the encoder 85 to be encoded and included in the signal Si outputted to the OR circuit 42.

Then, the code generating circuit 82 generates the index end code IENC in a predetermined bit arrangement. The code IENC is supplied to the encoder 85 to be encoded and included at the end of the by-phase mark signal Si outputted to the OR circuit 42.

Accordingly, the preamble signal, the start code ISTC, the index signal CDIX and the end code IENC are recorded in the area 242.

In the reproducing mode, first, only the signal Si in the signals Sp and Si from the switching circuit 36 (FIG. 4) is supplied to a decoder 86 (FIG. 7) wherein the index signal CDIX is decoded. The decoded index signal CDIX is then supplied to a CRCC check circuit 87 wherein an error check is performed in respect to the index signal CDIX by means of the CRC code.

The correct index signal CDIX from the check circuit 87 is supplied to a register 88 wherein it is converted from the serial form to a parallel index signal. The parallel index signal CDIX is written into the RAM 71 through the switching circuit 72. At this time, the address generating circuit 73 supplies the address signal indicative of the location in which the index signal CDIX is to be written into the RAM 71 through the switching circuit 74.

Further, the output from the decoder 86 is supplied to a detecting circuit 91 which detects the start code ISTC and the end code IENC and which supplies the detected codes ISTC and IENC to a control circuit 92 for controlling the checking circuit 87. As described above, when the start code ISTC is obtained, the subsequent blocks BLK1-BLK6 are taken in. When the end code IENC is obtained, the blocks BLK1-BLK6 are latched for the reproduction processing and the checking circuit 87 is inhibited from processing for several horizontal or line periods, that is, for a period in which the heads 34A and 34B may possibly scan the old area 242 on FIG. 3D. It is therefore possible to derive only the index signal CDIX in the new area 242' from the checking circuit 87.

When the index signal CDIX from the register 88 has been completely written into the RAM 71, the controller 52 supplies the address signal to the RAM 71 through the switching circuit 74 to read out the index signal CDIX. The read-out index signal CDIX is delivered to the controller 52 through the switching circuit 72, and thereafter processing dependent on the index signal, for example, a start point search, is effected.

Figure 8A:
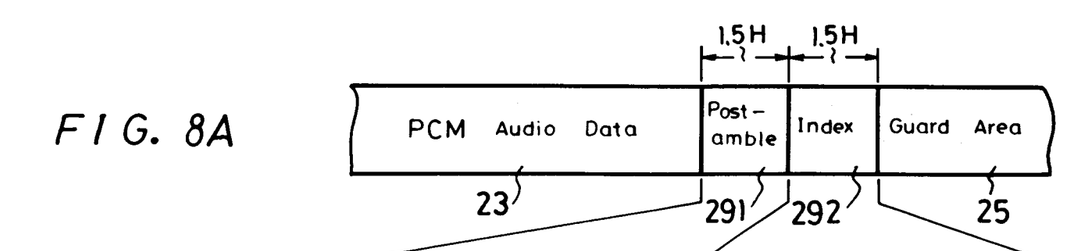
FIG. 8A is a diagram showing the same format as FIG. 2B for reference purposes.
Figure 8B:
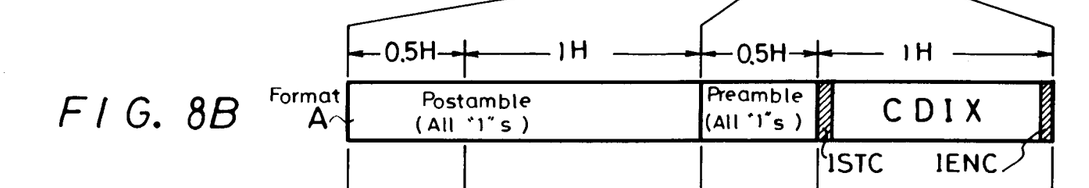
FIGS. 8B to 8F are diagrams showing other recording formats that may be used in apparatus according to the present invention.
Figure 8C:
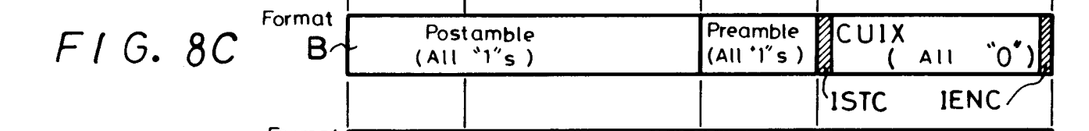
Figure 8D:
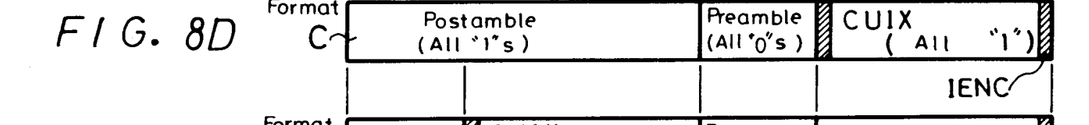

Other formats that can be used in accordance with the present invention will now be described with reference to FIGS. 8A-8F, in which FIG. 8A is similar to FIG. 2B in showing the arrangement of the areas 23, 24 and 25 in a track, FIG. 8B shows a format "A" corresponding to that described with reference to FIGS. 6B and 6C, and FIGS. 8C-8F show other respective formats "B"-"E". In the format "B" (FIG. 8C), the area 241 is designated to be a postamble area of PCM audio data. Signals all having the value "1" are recorded as the preamble signal for the whole 0.5 horizontal period from the beginning of the area 242, and signals all having the value "0" are recorded as a cue index signal CUIX for the entire remaining 1.0 horizontal period of the area 242. The format "C" of FIG. 8D is the same as that of FIG. 8C, except that signals all having the value "1" are recorded as the cue index signal CUIX. The signal CUIX is used simply as a start point search marker or cue index marker of the recording position while the signal CDIX is used for judging the relative or absolute address of the tape, the time code, whether the recorded audio in stereo, monaural or bi-lingual, and the like.

Figures 8E, 8F:
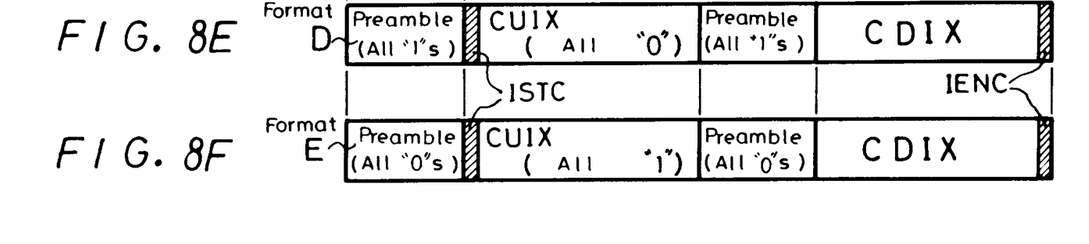

The formats "D" and "E" shown in FIGS. 8E and 8F each have the area 241 structured in the same manner as the area 242 of the formats "B" and "C" in FIGS. 8C and 8D, while the area 242 in each of the formats "D" and "E" is structured in approximately the same manner as the area 242 in the format "A".

In each of the formats "A", "B" and "C" (FIGS. 8B-8D), the start code ISTC and the end code IENC are added at the start and at the end, respectively, of the index signal CDIX or the cue index signal CUIX. In the case of each of the formats "D" and "E" (FIGS. 8E and 8F), the start code ISTC and the end code IENC are added at the start of the cue index signal CUIX and at the rear end of the index signal CDIX, respectively.

Figure 9A:
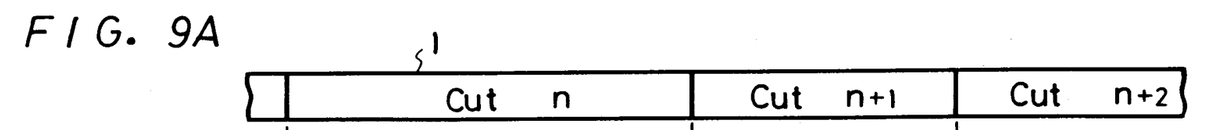
FIGS. 9A to 9E are diagrams each showing a length of recording tape divided into cuts or chapters in the longitudinal direction, and indicating the formats used for recording index signals in such cuts or chapters in accordance with various embodiments of the invention.

The above-described formats can be used in various arrangements designated as types I-IV, respectively, and which are particularly suited for achieving different functions in VTRs of various grades or quality. In connection with the foregoing, it will be seen on FIG. 9A that a record on a tape may be divided, in its longitudinal direction, into a number of successive cuts or chapters n, n+1, n+2 etc.

Figure 9B:
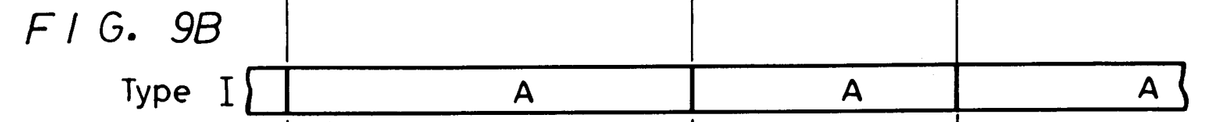

In the case of the Type I arrangement shown in FIG. 9B, the index signal is recorded in accordance with Format "A" of FIG. 8B regardless of the cuts. Therefore, the Type I arrangement is used in an upper grade VTR for obtaining information, such as, the absolute address or the like, by checking the ID codes ID0–ID5 of the index signal.

Figure 9C:
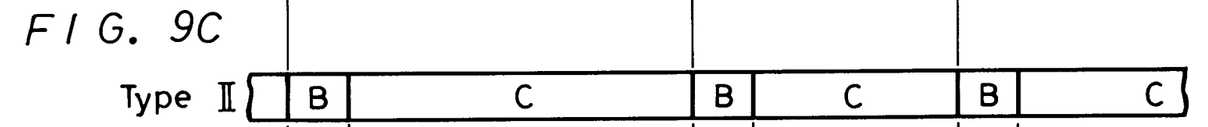

In the case of the Type II arrangement shown in FIG. 9C, the index signal is recorded in accordance with Format "B", for example, for 10 seconds from the beginning of each cut, and in accordance with Format "C" during the remaining periods. Therefore, the Type II arrangement is desirably used in a lower grade or low cost VTR for effecting the start point search by judging "0" or "1".

Figure 9D:
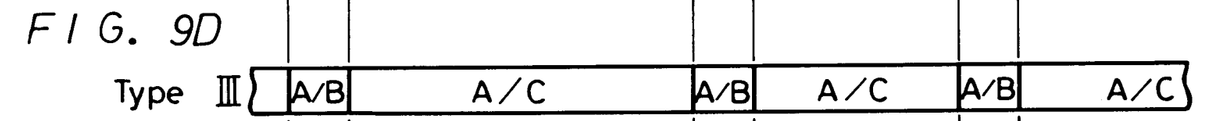

In the case of the Type III arrangement shown in FIG. 9D, the index signal is recorded in the alternate tracks 2 in accordance with Formats "A" and "B" respectively, for example, for 10 seconds from the beginning of each cut, and then alternately in accordance with Formats "A" and "C" for the remaining periods. Therefore, the Type III arrangement can be used in a lower grade VTR for carrying out the start point search of each cut by judging "0" and "1" of the index signal CUIX and also in an upper grade VTR for obtaining information, such as, the absolute position or the like, by checking the ID codes ID0–ID5 of the index signal CDIX. In other words, the Type III format arrangement is compatible for the lower-grade and upper-grade VTRs.

Figure 9E:
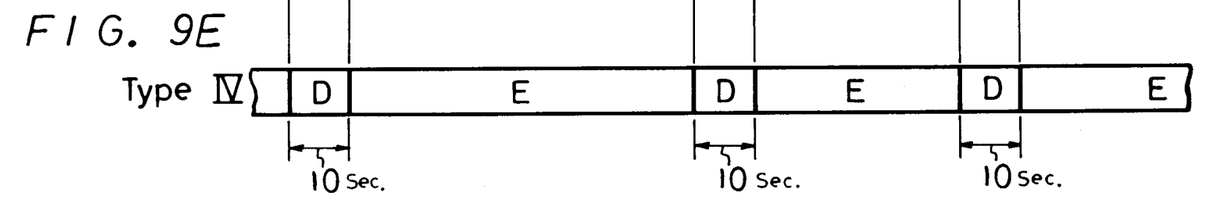

In the case of the Type IV arrangement shown in FIG. 9E, the index signal is recorded on the track 2 in accordance with Format "D", for example, for 10 seconds from the beginning of each cut, and in accordance with Format "E" for the remaining periods. The, Type IV arrangement can be used in a lower grade VTR for carrying out the searching for the start point of each cut by judging "0" or "1" of the index signal CUIX, and also in an upper grade VTR for obtaining information, such as, the absolute position or the like, by checking the ID codes ID0–ID5 of the index signal CDIX. Therefore, the Type IV arrangement is also compatible for the lower-grade and upper-grade VTRs.

In the embodiment described above with reference to FIG. 6C, the start code ISTC is inserted at the start of the plurality of blocks BLK1–BLK6. Instead of such arrangement using the start code ISTC, the head marker MK (FIG. 10D) which is arranged at the head of the blocks BLK1–BLK6 can be used as the start code, as shown in FIG. 10C. In this case, after the head marker MK is detected, the CRCC check is effected five times. After the end code IENC is finally detected, the data codes in all the blocks are considered valid.

The invention has been described above as applied to an 8 mm video tape recorder. However, the present invention can be also adapted to a multi-track recorder wherein the video signal area 28 of each track is divided into a plurality of segments, for example, into five segments, each corresponding to angular travel of the head through 36°, and different kinds of information signals such as PCM audio signals and image signals representative of still images or the like are recorded in, and reproduced from the divided segments. Further, it is possible in the case of Formats A–C to maintain each area 241 unrecorded, or to record and reproduce other index signals in each area 241. Furthermore, instead of prohibiting processing of an old index signal by the detecting circuit 91 and the control circuit 92, the old index signal may simply be ignored by the controller 52. It is also possible to generate the start code ISTC and the end code IENC in the controller 52 rather than in the code generating circuit 82. The present invention can be also adapted to the recording of the index signal in, and the reproducing of the same from the areas 21, 22 and 29 of the track 2 shown on FIG. 1.

Figure 10A:
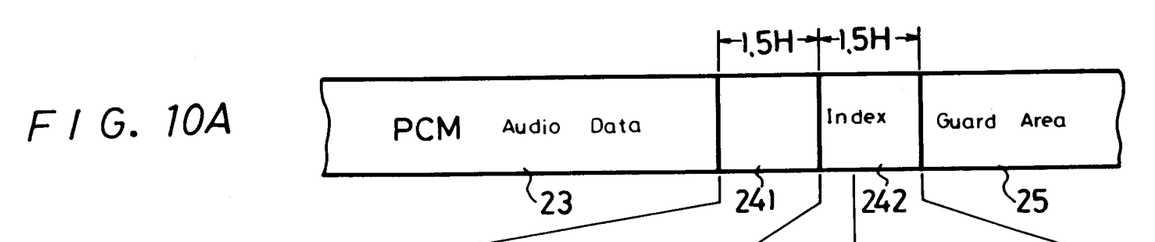
FIGS. 10A to 10D are diagrams similar to those of FIGS. 6A to 6D, respectively, but showing another recording format that can be used in accordance with an embodiment of this invention.
Figures 10B, 10C, 10D:
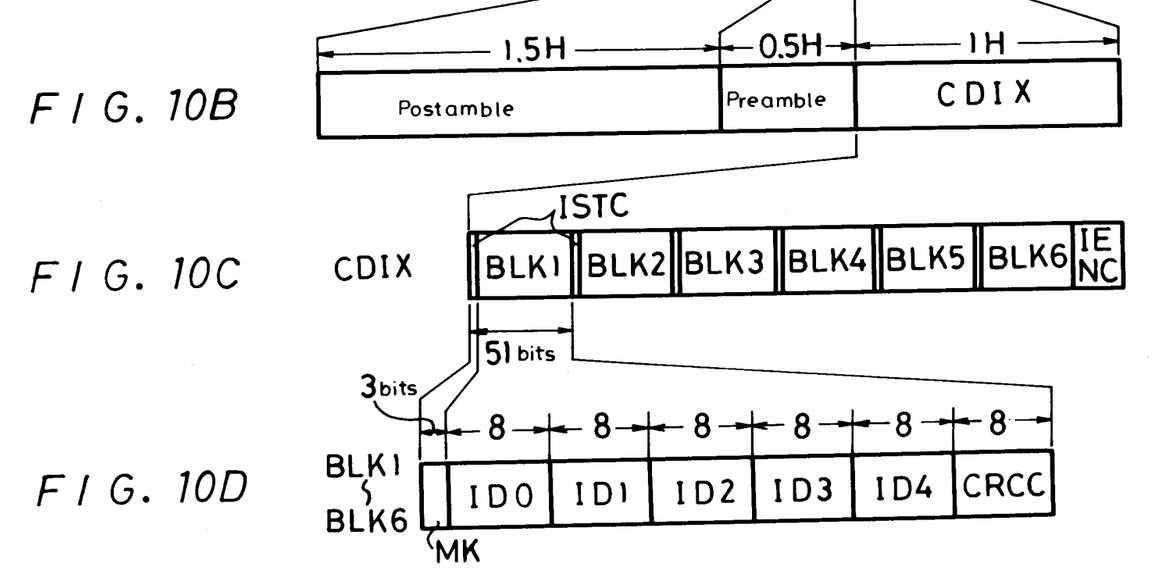
Figure 11A:
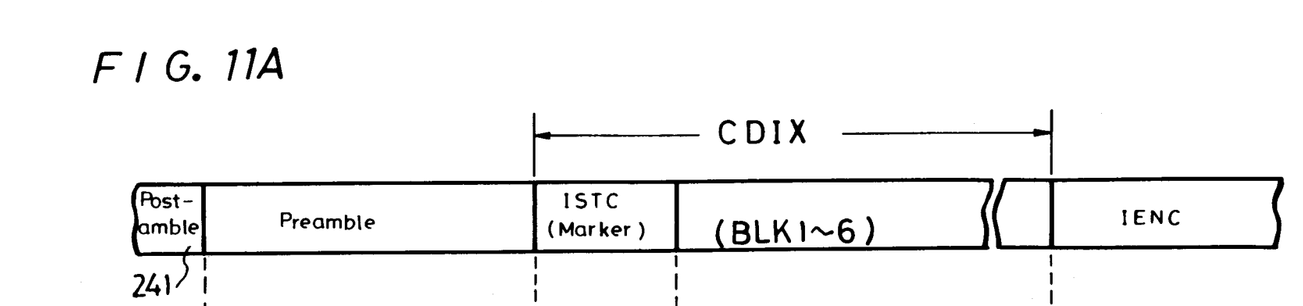
FIGS. 11A to 11C are diagrams showing an example of a data sequence in the case of the format of FIGS. 10A to 10D.
Figure 11B:
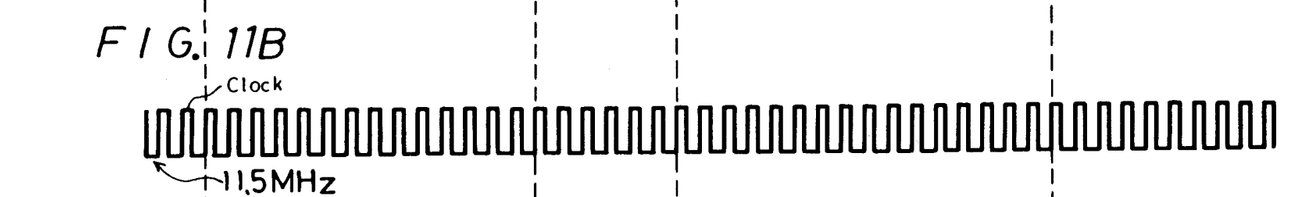
Figure 11C:
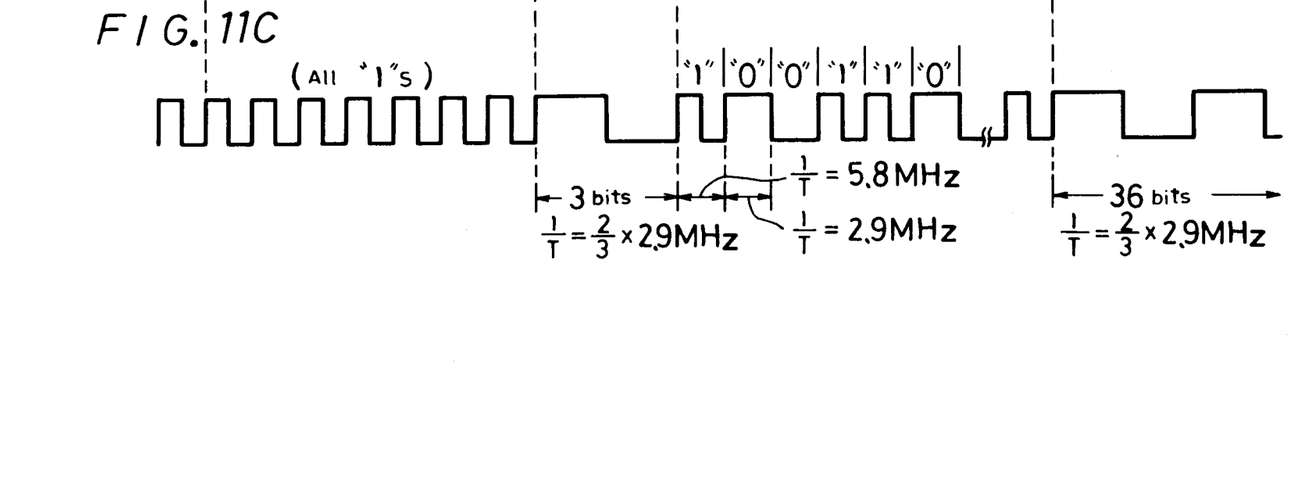

FIGS. 11A–11C show specific data constructions of the data format shown in FIGS. 10A–10D. More particularly, FIG. 11A corresponds to FIGS. 10A and 10B, and FIG. 11B shows the waveform of a system clock of 11.5 MHz. FIG. 11C shows a data sequence comprised of the preamble which is exclusively formed of "1"s ("1" is formed of a magnetic sequence which is inverted at the generation of every clock), a marker or header of 5.8/3 MHz (used also as the start code ISTC), the coded data (BLK1–BLK6) and the data of the end code IENC. The end code IENC is formed, for example, of 36 bits of "1" and "0" with the frequency 5.8/3 MHz and provided in sequence.

According to the present invention, since the index signal CDIX is recorded in the part 242 of the postamble area 24, the necessary ID code can be immediately obtained even in the search reproducing operation. More particularly, the start code ISTC and the end code IENC are added to the index signal CDIX at the start and rear end portions thereof, respectively. Therefore, in the reproduction mode, when the start code ISTC is obtained, the subsequent blocks BLK1–BLK6 are taken in, and, when the end code IENC is obtained, the blocks BLK1–BLK6 are latched for the reproducing operation and further taking in of the signal CDIX is inhibited for several horizontal periods thereafter. Therefore, even if an old index signal area 242 remains behind the new index signal area 242' as shown in FIG. 3D, only the correct index signal CDIX can be obtained from the area 242' without taking in the index signal CDIX from the old index signal area 242.

Even in the case where the old index signal area 242 remains before the new index signal 242' as shown in FIG. 3E, the end code IENC of the old area 242 is written-over by the new index signal CDIX so that the old index signal CDIX is not latched. Accordingly, it is possible to take in only the new index signal CDIX.

Although illustrative embodiments of the invention have been described in detail herein with reference to the drawings, it will be understood that the invention is not limited to those precise embodiments, and that various changes and modifications can be effected therein by one skilled in the art without departing from the scope or spirit of the invention as defined in the appended claims.

What is claimed is:

1. An apparatus for recording and/or reproducing, in successive slant tracks on a record tape, an information signal comprised of at least an audio signal and an index signal for use in controlling transportation of the tape, comprising:
audio signal processing means for converting an input audio signal to a digitized form in which the audio data for a predetermined length of time is grouped as a plurality of data blocks;
transducer means scanning said successive slant tracks and being connected to said audio signal processing means for recording and/or reproducing said grouped data blocks containing the digitized audio signal for said predetermined length of time in a first part of a respective slant track on the tape;

index signal generating means including means for generating a coded index signal to indicate respective input information;

index area signal generating means for providing an index area signal in predetermined timed relation to said scanning by said transducer means of said first part of each said slant track;

switching means responsive to said index area signal for supplying said coded index signal to said transducer means for recording by the latter in a second part of said respective slant track which is located adjacent an end of said first part of said respective slant track; and start code and end code generating means for inserting a predetermined coded pattern into a starting area and an ending area of said coded index signal recorded in said second part of said respective slant track.

2. The apparatus according to claim 1; in which said input information indicated by said coded index signal is an absolute-tape position address counted from a predetermined reference position on the record tape.

3. The apparatus according to claim 1; in which said input information indicated by said coded index signal is a time code indicating the running time for transportation of the tape from a reference position thereon.

4. The apparatus according to claim 1; in which said input information indicated by said coded index signal is a mode signal indicating the speed at which the tape is transported during recording of the digital audio signal thereon.

5. The apparatus according to claim 1; in which said input information indicated by said coded index signal further includes cue index information which identifies a cut point of each scene and a start or end point of each program chapter on the tape.

6. The apparatus according to claim 1; in which said coded index signal is formed of a plurality of blocks comprising plural kinds of index informations, and each of said blocks has a marker for indicating the start point thereof and which constitutes a start code of said coded index signal.

* * * * *